Patented Aug. 22, 1939

2,170,491

UNITED STATES PATENT OFFICE 2,170,491

MANUFACTURE OF AMINOTRIAZINES

Gustave Widmer, Basel, and Willi Fisch, Riehen, near Basel, Switzerland, assignors to the firm Society of Chemical Industry in Basle, Basel, Switzerland No Drawing. Application September 28, 1938, Serial No. 232,228. In Switzerland October 5, 1937

3 Claims. (Cl. 260—248)

The present invention relates to the manufacture of 2.4.6-triamino-1.3.5-triazine (melamine) from dicyandiamide in the presence of ammonia.

It is known that melamine is produced when a solution of dicyandiamide in liquid ammonia is heated for some hours at 100° C. (Franklin, Journal of the American Chemical Society, vol. 44, page 504, 1922). The yield obtained, however, is below 30 per cent. As described in the copending application Ser. No. 217,627, the yield may be increased by using a smaller quantity of ammonia than is necessary for dissolving the dicyandiamide at room temperature. Still higher yields and indeed up to 100 per cent are obtainable as described in the copending application Ser. No. 113,936 if about equal quantities of dicyandiamide or cyanamide and liquid ammonia are treated together at about 160° C. In the latter process a pressure of about 200 atms. is produced, which necessitates troublesome and costly high pressure apparatus.

This invention relates to a process in which yields up to 100 per cent may be obtained while avoiding the said high pressure by inducing the conversion of dicyandiamide or cyanamide with addition of liquid ammonia at a temperature not essentially above 100° C. and then completing the operation by distilling off the ammonia at a higher temperature and under a pressure essentially below 200 atms.

A preferred procedure consists in first inducing the conversion with addition of liquid ammonia at a temperature of 80–110° C. and at a pressure of the order of about 10–50, preferably 20–40, atms., and then distilling off the ammonia while retaining this comparatively low pressure with simultaneous or subsequent raising of the temperature of the mass. By this rise of temperature in the presence of ammonia the reaction is practically brought to an end. Since the conversion of dicyandiamide or cyanamide to melamine is strongly exothermic the height of the final temperature is very much dependent on the degree of the conversion in the preliminary reaction. If, for example, the mass is kept only for a short time (up to a few hours) at 100° C. the final temperature of about 300° C. may be produced. If, however, the greater part of the conversion has been brought about already at 100° C., for example in the course of 18 hours, the final temperature due to the exothermic change is not so high. It may indeed happen that the desired final temperature can be attained only by application of external heat. Advantageously, however, the final reaction is conducted at 150–300° C., if desired with application of heat. In this case yields up to 100 per cent of melamine, calculated on the dicyandiamide or cyanamide used may be obtained without the necessity for high pressure apparatus. It is, therefore, possible by this new process to obtain the same good yield of melamine as is produced by the process of the copending application Ser. No. 113,936, at a working pressure which instead of being about 200 atms. is considerably lower, for example 20–40 atms.

The following example illustrates the invention:

Into an autoclave of 600 litres capacity and adjusted for a working pressure of 40 atms. and also provided with a powerful stirrer there are introduced under pressure 225 kilos of dicyandiamide and 60 kilos of ammonia. The mass is then heated for 4 hours while stirring, and with good temperature control, at 100° C., whereby a pressure of 25–30 atms. is produced. The greater part of the ammonia is now distilled and the autoclave is further heated to an external temperature of 150° C. The internal temperature now begins to rise quickly whereby the ammonia distils from the mass, the pressure not exceeding 40 atms. The exothermic reaction produces a final temperature of about 265° C. The autoclave is now allowed to cool in the course of a few hours, stirring being continued. After finally blowing off the ammonia, the product separates in the form of a fine grey powder which can easily be discharged pneumatically. It contains 98–100 per cent of melamine.

What we claim is:

1. In the manufacture of melamine from a cyan derivative of ammonia selected from the group consisting of dicyandiamide and cyanamide with addition of liquid ammonia under pressure, the feature of conducting the reaction in two phases, the first phase consisting in inducing the conversion in presence of the liquid ammonia at a temperature not substantially higher than 100° C. and the second phase consisting in completing the conversion at a higher temperature while distilling off ammonia at such a rate that the pressure is kept substantially lower than 200 atmospheres.

2. In the manufacture according to claim 1, the feature of maintaining the pressure throughout the process at a range between 10 to 50 atmospheres.

3. In the manufacture according to claim 1, the feature of inducing the conversion at a temperature between 80 and 110° C. and completing the conversion at a temperature between 150 and 300° C.

GUSTAVE WIDMER.
WILLI FISCH.